Jan. 30, 1951     C. H. GROGAN     2,539,418
APPARATUS FOR TESTING PIEZOELECTRIC PRESSURE GAUGES
Filed Feb. 27, 1946
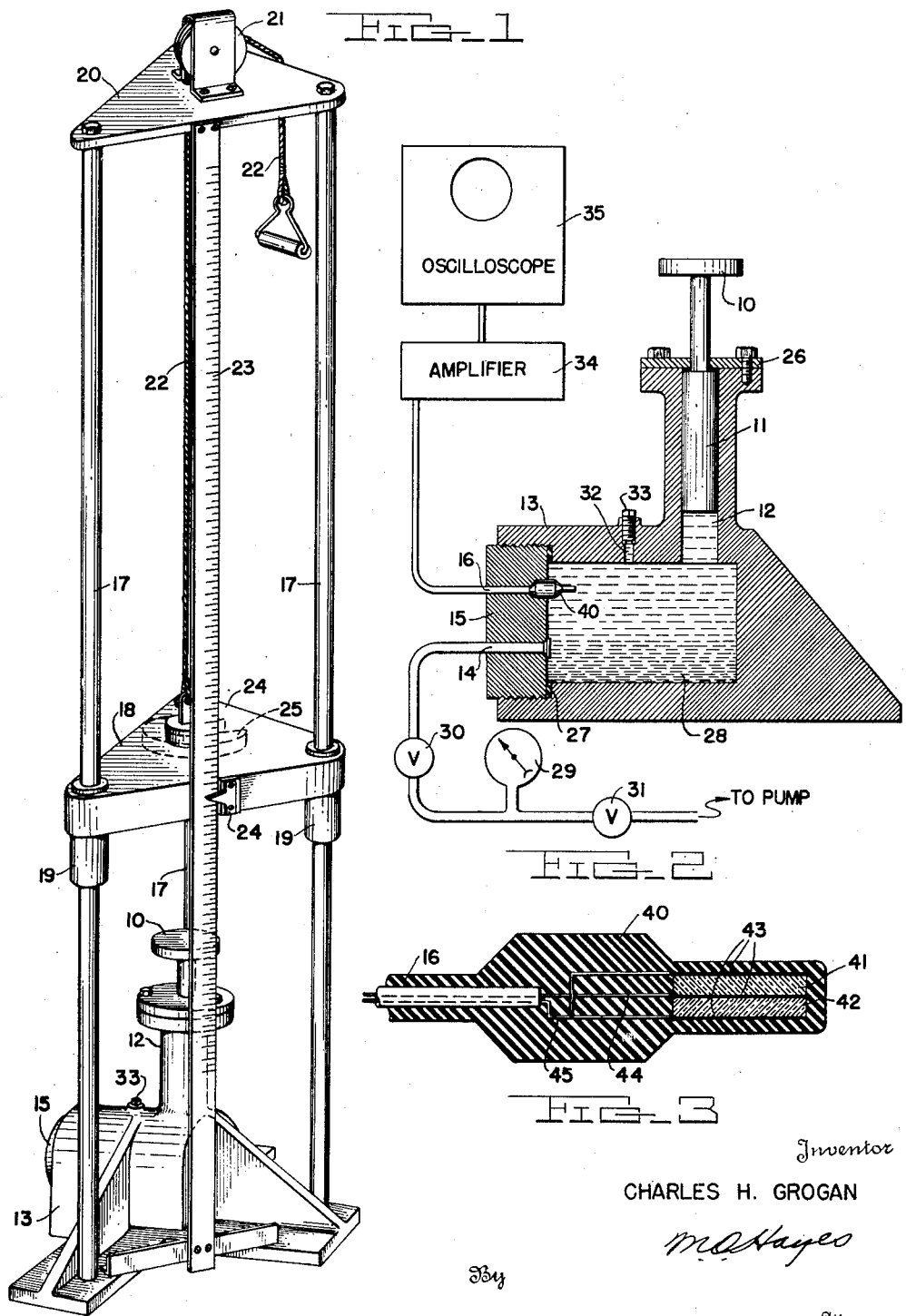
Inventor
CHARLES H. GROGAN Patented Jan. 30, 1951

2,539,418

UNITED STATES PATENT OFFICE 2,539,418

APPARATUS FOR TESTING PIEZOELECTRIC PRESSURE GAUGES

Charles H. Grogan, West Falls Church, Va.

Application February 27, 1946, Serial No. 650,585

2 Claims. (Cl. 73—4)

(Granted under the act of March 3, 1883, as amended April 30, 1928; 370 O. G. 757)

This invention relates in general to piezoelectric crystal calibrating, and more particularly, to a method of directly calibrating piezoelectric crystal units to measure dynamic fluid pressures, and means thereof.

In certain types of work it is desirable to know the value of the voltage that will be developed across the polar faces of a given piezoelectric crystal feeding into a given electrical impedance when subjected to a dynamic fluid pressure of known value. A crystal so calibrated may then be used as a gauge to measure dynamic fluid pressure, such as may be developed in underwater or air explosions, water hammer, cylinders of internal combustion engines, and other similar devices in which occur substantially sudden changes of fluid pressure.

There are several types of monoaxial crystals which respond electrically to fluid pressure and are suitable for use in pressure gauges. One of the most satisfactory of these is tourmaline. To increase the sensitivity of the gauge, a plurality of crystals, cut into slabs and operatively connected in the proper polarity so as to add up their charges, are often used. The electrical faces of the crystals are usually coated with a conducting material to facilitate electrical connection. The complete assembly may be molded in rubber to isolate the crystals from the fluid and to provide a convenient supporting means. Such crystal gauges are represented by the tourmaline units #283 and #284, manufactured by the Standolind Oil and Gas Company.

It is also possible to use multitaxial piezoelectric crystals, such as the quartz #301-A Engine Pressure Indicator manufactured by the Radio Corporation of America, by properly designing the crystal mounting so as to confine the pressure to only one electrically-responsive distortion axis. In the specification herein described, monoaxial crystals such as tourmaline, are used in the preferred embodiment but it is to be understood that any crystal gauge responsive to dynamic fluid pressure may be calibrated, when suitably mounted, in the manner to be described in the invention.

The E. M. F. applied to an electrical measuring circuit by a piezoelectric crystal is $$E = \frac{Q}{C}$$

where Q is the charge on the crystal in coulombs, C is the total capacity of the connecting cable and amplifier input circuit, and E is the voltage at any instant. The charge is determined from the expression $$Q = KPA$$

where A is the effective area of the crystal, P is the pressure in pounds per square inch, and K is the piezoelectric constant in coulombs per pound. To calculate the voltage across a crystal from this information requires that the effective area be determined to a high degree of precision, which in practice is very difficult to attain. The invention described herein overcomes this difficulty by making possible the generation of any chosen fluid pressure and actually measuring the voltage developed across the crystal unit when it is subjected to this known pressure.

The calibrating system can be considered as a piezoelectric crystal, with suitable electrical connections, immersed in a fluid which is contained in a rigid tank with a piston at one end. The piston is suddenly advanced at a high velocity for a short time by a falling weight striking the striking-head of the piston. The same effect could be obtained by driving the piston by compressed air, springs, or other suitable mechanism. The advancing piston compresses the fluid in the tank, causing a decrease in the fluid volume and a change in pressure. If the walls of the tank are sufficiently rigid so that expansion of the enclosure can be neglected, the pressure built up in the system adiabatically will ultimately depend on the volume change and the modulus of elasticity of the fluid medium. The pressure in the tank for a constant volume of the fluid container is directly proportional to the area of the piston. By equating the energy of the mass to the work done on the system, the following expression for maximum pressure, $P_{max}$ is derived:

$$P_{max} = \frac{2Wh}{BV}$$

where W is the weight, $h$ is the height-of-fall, B is the compression per unit volume, per pound, per square inch, and V is the total volume. This equation applies only if all the energy from the falling mass is transferred to the medium, assumes a rigid container, and assumes a uniform pressure throughout the fluid at any instant. It further requires a constant volume of the container, and neglects frictional losses in the system and the variation of B with P. Since all the energy will not be transferred at the initial contact, a series of pressure pulses of decreasing magnitude will be expected, since the weight will bounce several times due to the elasticity of the fluid and the steel. A single blow may be obtained by preventing bouncing. The governing factor that enters into the maximum pressure generated for a system of constant volume change and rigid confinement, assuming frictional losses reduced to a minimum, is then the total available energy transferred from the weight on contact with the piston. All these factors may be experimentally eliminated by merely measuring accurately the travel of the piston and calculating the volume change. Piston-travel distance may be accurately measured by mounting a hard stylus on a striking-head or cylinder in such a way as to scratch a line in a soft brass or plastic strip, which may be fixed to the tank structure.

The piezoelectric crystal to be calibrated is placed in the fluid in the tank with suitable electrical connections brought out therefrom, and connected through an amplifier to an indicating device such as a cathode-ray oscilloscope. When the weight is dropped on the piston, the pressure may be calculated as described above or obtained from previous static piston-deflection-pressure calibration curves, and the resulting deflection on the oscilloscope will give the voltage information necessary for crystal calibration. The tank may be brought up to any static pressure reference level desired by means of a fluid pump feeding through an appropriate fluid line. The magnitude of the static pressure is read by a suitable gauge.

An object of this invention is to provide a simple and accurate method, and a device therefor, of determining the sensitivity of piezoelectric crystals or evaluation of the gauge constant of piezoelectric gauges.

Other further objects and features of this invention will be apparent from the following specification and drawings showing only an exemplary embodiment of the invention, in which:

Figure 1 is a pictorial drawing of the calibrating equipment excluding the auxiliary indicating equipment and static pressure equipment.

Figure 2 is a side elevation view, partly in section, of the pressure tank.

Figure 3 is a side elevation view, partly in section, of the crystal gauge to be calibrated.

Referring now to Figure 1 in detail, striking-head 10, coaxially mounted to piston 11, is shown extending into cylinder 12, which is an integral part of the casting of rigid tank 133. The fluid is fed in through tube 14 sealed in end plug 15. The electrical connector 16 of the piezoelectric crystal gauge is brought out through a sealed orifice in end plug 15. The three guide rods 17 are mounted to the base of tank 13 and are precisely machined so as to offer a minimum amount of friction to the falling weight. The main weight 18 is a triangular piece of metal having accurately machined bearings 19 at each corner which engage guide rod 17 in a smooth, appreciably frictionless manner. Spacing plate 20 is fixed to the top of guide rods 17 in such a manner as to maintain their parallel relationship, and to act as a support for pulley 21. Main weight 18 is pulled up to the desired height by rope 22, which is fastened thereon, and extends up through an opening in spacing plate 20 and operatively engages pulley 21. Scale 23, which is fixed between the base plate of tank 13 and spacing plate 20, gives an accurate measure of the distance that weight 18 falls. If the zero reference is taken at the top of striking head 10, then such falling distance is read directly from pointer 24 mounted on weight 18, and scale 23. An auxiliary weight 25, shown in dotted lines in Figure 1, may be added to weight 18, so that the desired striking impact may be realized.

Attention is now invited to Figure 2 where an enlarged view of the pressure tank 13 is shown sectionally in side elevation. Piston 11 and cylinder 12 are lapped to form a pressure-sealed contact, and striking-head 10 is shown as integral part of piston 11. End plug 15, containing hydraulic line 14 and crystal gauge connector 16, is screwed into tank 13 and makes a pressure-sealed contact with said tank by means of sealing ring 27. Sealing ring 27 is soft material such as lead or copper. The fluid 28 in tank 13 is pumped in from hydraulic line 14 through an orifice in end plug 15 and may be maintained at a chosen static pressure, as indicated on Bourdon gauge 29. Valves 31 and 30 are for maintaining the static fluid pressure and protecting gauge 29, respectively. The outward motion of piston 11, caused by the static fluid pressure in tank 13, is limited by limiting ring 26 which is bolted to the frame of cylinder 12. The hydraulic system may be bled through orifice 32 in the wall of tank 13, and sealed with pipe cap 33. Crystal gauge 40 is connected to amplifier 34 through electrical connector 16, which is brought out from a pressure-sealed orifice in end plug 15. The output of amplifier 34 is fed to a calibrated oscilloscope 35 where the electrical response of the crystal may be viewed and measured.

Figure 3 is an enlarged side-elevation view of the crystal gauge 40. The monoaxial crystals 41 and 42 are coated with an electrically conducting material 43 and are stacked together in parallel. Electrical connections 44 and 45 are made to the conductive surfaces, and are part of cable 16. The completed unit is then molded into a rubber housing 40, shown in cross-sectional view, or other suitable material.

The method of calibrating a crystal gauge is quite simple. Pipe cap 33 is removed and valves 31 and 30 are opened. A fluid, such as water is pumped into tank 13. When the enclosure is completely filled, pipe cap 33 is screwed back into place, forming a pressure-sealed plug. The pump may now be employed to bring the liquid in the tank up to any desired reference hydrostatic pressure, for example, 350 pounds per square inch. When the desired hydrostatic pressure has been obtained, valve 31 is closed and the exact hydrostatic pressure is read on Bourdon gauge 29. Before the actual shock pressure test, valve 30 is closed to protect gauge 29. If crystal unit 40 feeds into a very high impedance, such as the input of a vacuum tube, a voltage corresponding to the degree of hydrostatic pressure may be read on a suitable indicating instrument. If, however, the input impedance of the amplifier is of a lower value, it will tend to discharge the crystal and no static reading will be obtained.

The maximum theoretical dynamic pressure generated in the embodiment herein described using a weight of 80 pounds, a distance-of-fall of 30.5 inches and a value of K equal to $3.08 \times 10^{-6}$, was 5630 pounds per square inch. With this data, the maximum piston travel was about 4 inches. The form as well as the amplitude of the pressure wave generated may be observed on a long persistence cathode-ray tube in oscilloscope 35. The form and amplitude of the pressure wave may be changed by varying the length of the fluid column and impact velocity of the mass.

The invention described herein may be manufactured and used by or for the Government of the United States of America for governmental purposes without the payment of any royalties thereon or therefor.

What is claimed is:

1. A testing apparatus comprising in combination a rigid sealed tank, a fluid contained therein and completely filling said tank, a cylinder orifice included in the wall of said tank, a movable piston operable in said cylinder and against the fluid in said tank, means operable to suddenly impart a known amount of energy to the piston in a direction to compress the fluid, pump means to create a known static pressure in said tank, limiting means to limit the upward stroke of said piston, means to seal into the tank a piezoelectric crystal with suitable electric leads brought out therefrom, and indicating means connected to the crystal leads, whereby the electrical response to a given dynamic or static pressure or both may be ascertained.

2. A testing apparatus comprising in combination a rigid sealed tank completely filled with a fluid, a movable piston means extending through a sealed opening in a wall of said tank for varying the volume of fluid therein, means for limiting the movement of said piston in the direction opposite to the direction of increasing fluid pressure, a piezoelectric crystal having suitable output leads sealed into said tank for giving an electrical indication of the pressure therein, and means operable to suddenly impart a known amount of energy to said piston means.

CHARLES H. GROGAN.

REFERENCES CITED

The following references are of record in the file of this patent:

UNITED STATES PATENTS

| Number | Name | Date |
| --- | --- | --- |
| 2,336,078 | Eckstein | Dec. 7, 1943 |
| 2,412,192 | Agnew | Dec. 10, 1946 |

FOREIGN PATENTS

| Number | Country | Date |
| --- | --- | --- |
| 295,256 | Great Britain | July 25, 1929 |